United States Patent
Goel et al.

(10) Patent No.: US 9,392,057 B2
(45) Date of Patent: Jul. 12, 2016

(54) SELECTIVELY EXCHANGING DATA BETWEEN P2P-CAPABLE CLIENT DEVICES VIA A SERVER

(71) Applicant: QUALCOMM Incorporated, San Diego, CA (US)

(72) Inventors: Amit Goel, San Diego, CA (US); Mohammed Ataur Rahman Shuman, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 14/251,265

(22) Filed: Apr. 11, 2014

(65) Prior Publication Data

US 2015/0296004 A1 Oct. 15, 2015

(51) Int. Cl.
*G06F 15/16* (2006.01)
*H04L 29/08* (2006.01)
*H04L 29/06* (2006.01)

(52) U.S. Cl.
CPC .............. *H04L 67/104* (2013.01); *H04L 63/30* (2013.01); *H04L 67/1093* (2013.01); *H04L 67/141* (2013.01)

(58) Field of Classification Search
CPC .... H04L 63/30; H04L 67/104; H04L 67/1093
See application file for complete search history.

(56) References Cited

U.S. PATENT DOCUMENTS

| | | | |
|---|---|---|---|
| 8,086,842 B2* | 12/2011 | Sidhu | H04L 63/0823 713/150 |
| 8,090,359 B2 | 1/2012 | Proctor, Jr. et al. | |
| 8,385,913 B2* | 2/2013 | Proctor, Jr. | G06Q 30/0623 455/41.2 |
| 8,386,619 B2 | 2/2013 | Mallet et al. | |
| 8,917,311 B1* | 12/2014 | Yang | H04L 65/1069 348/14.01 |
| 9,021,223 B2* | 4/2015 | Elkington | G06F 3/0604 711/162 |
| 2005/0169219 A1* | 8/2005 | Serpa | H04L 29/12254 370/338 |
| 2008/0133767 A1 | 6/2008 | Birrer et al. | |
| 2008/0310329 A1* | 12/2008 | Sun | H04W 72/082 370/280 |
| 2009/0046683 A1* | 2/2009 | Jung | H04W 56/002 370/338 |

(Continued)

FOREIGN PATENT DOCUMENTS

EP 2373075 A1 10/2011

OTHER PUBLICATIONS

International Search Report and Written Opinion—PCT/US2015/020594—ISAEPO—Jul. 10, 2015.

*Primary Examiner* — Mohamed Wasel
(74) *Attorney, Agent, or Firm* — Muncy, Geissler, Olds & Lowe, P.C.

(57) ABSTRACT

In an embodiment, a first client device establishes a P2P connection with a second client device. While the P2P connection is still established, the first client device receives a request to send data to the second client device via the P2P connection, and then sends the data to a server along with an indication of a temporary identifier of the second client device without notifying an operator of the first client device that the data is being sent to the server. In another embodiment, the server receives the data, maps the temporary identifier to a unique network address of the second client device and generates a record of the data transmission between the respective client devices. In another embodiment, the server maintains an association for the temporary identifier after the first and second client devices are disconnected from their P2P connection to permit supplemental communication.

32 Claims, 10 Drawing Sheets

(56) References Cited

U.S. PATENT DOCUMENTS

| | | |
|---|---|---|
| 2012/0076303 A1 | 3/2012 | O'Leary |
| 2012/0291109 A1 | 11/2012 | Minamizawa |
| 2014/0007154 A1 | 1/2014 | Seibold et al. |
| 2014/0149512 A1* | 5/2014 | Leitch .................. H04L 67/1061 709/204 |
| 2014/0337478 A1* | 11/2014 | Altmaier ............. H04L 61/2567 709/219 |
| 2015/0319595 A1* | 11/2015 | Hakola .................. H04W 8/005 370/254 |

\* cited by examiner

SELECTIVELY EXCHANGING DATA BETWEEN P2P-CAPABLE CLIENT DEVICES VIA A SERVER

BACKGROUND OF THE INVENTION

1. Field of the Invention

Embodiments of the invention relate to selectively exchanging data between peer-to-peer (P2P)-capable client devices via a server.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

Often, there is a business need for one client device to quickly exchange data (e.g., media, information or files, etc.) with other client device(s) in a "formal" way (e.g., as opposed to an "informal" peer-to-peer (P2P) exchange). However, such exchanges typically require the client device to acquire personal contact information (e.g., a unique user address at which a user can be contacted such as an email address, phone number, Skype Username, Facebook ID, LinkedIn ID, or a unique network address at which an associated UE can be contacted via a network such as a MAC ID, phone number, etc.). For example, assume that at a business luncheon attended by a small group of people, a luncheon participant takes a group photo and wants to share the group photo with each other attendee of the group luncheon. In this case, it is probably not practical for the luncheon participant to obtain the personal contact information of each other attendee. In another example, assume that a marketing person wants to hand out a digital information brochure to conference attendees. In this case, recipients of the digital information brochure may not want to browse the digital information brochure without divulging any personal contact information to the marketing person. Also, certain transactions can occur via P2P protocols specifically to avoid a formal record by their respective operators. For example, criminals may wish to exchange data files via P2P without form records of the data transfer being recorded.

SUMMARY

In an embodiment, a first client device establishes a P2P connection with a second client device. While the P2P connection is still established, the first client device receives a request to send data to the second client device via the P2P connection, and then sends the data to a server along with an indication of a temporary identifier of the second client device without notifying an operator of the first client device that the data is being sent to the server. In another embodiment, the server receives the data, maps the temporary identifier to a unique network address of the second client device and generates a record of the data transmission between the respective client devices. In another embodiment, the server maintains an association for the temporary identifier after the first and second client devices are disconnected from their P2P connection to permit supplemental communication.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
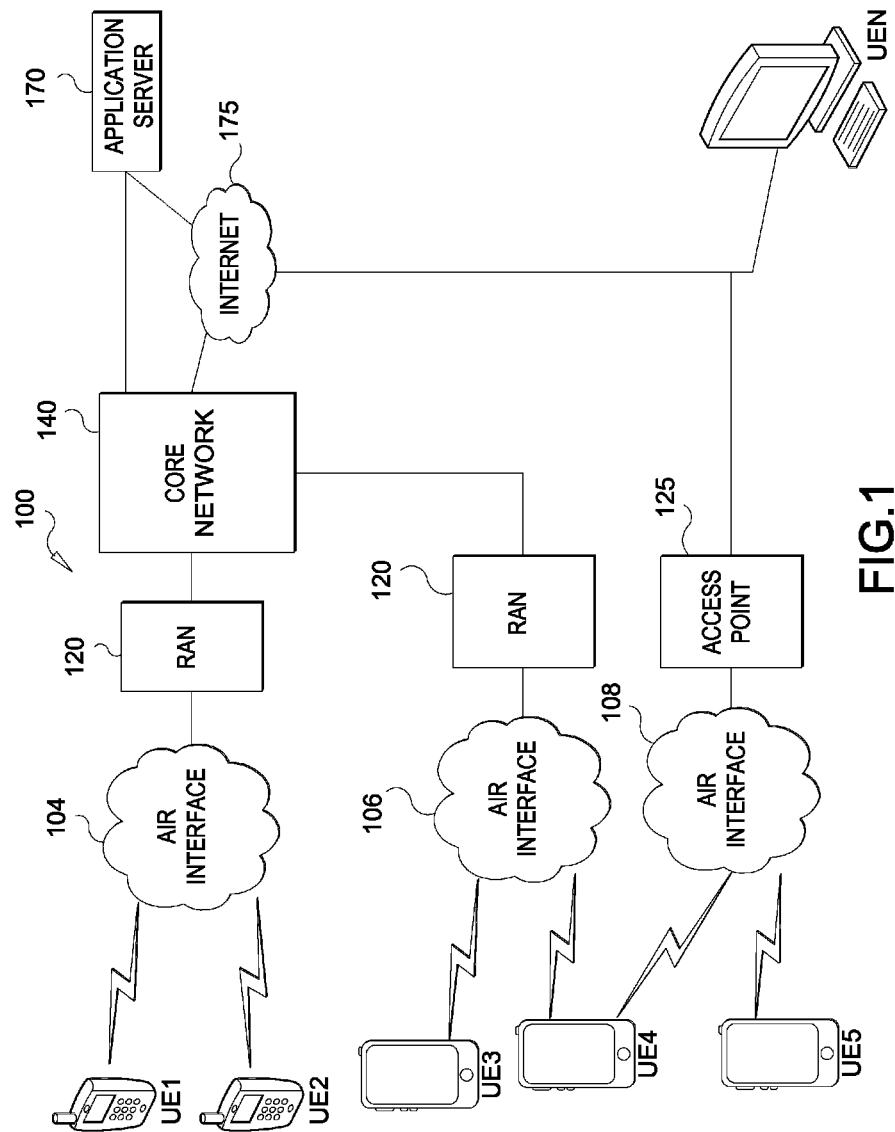
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 ... N. The UEs 1 ... N can include cellular telephones, personal digital assistant (PDAs), pagers, a laptop computer, a desktop computer, and so on. For example, in FIG. 1, UEs 1 ... 2 are illustrated as cellular calling phones, UEs 3 ... 5 are illustrated as cellular touchscreen phones or smart phones, and UE N is illustrated as a desktop computer or PC.

Referring to FIG. 1, UEs 1 ... N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 ... N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
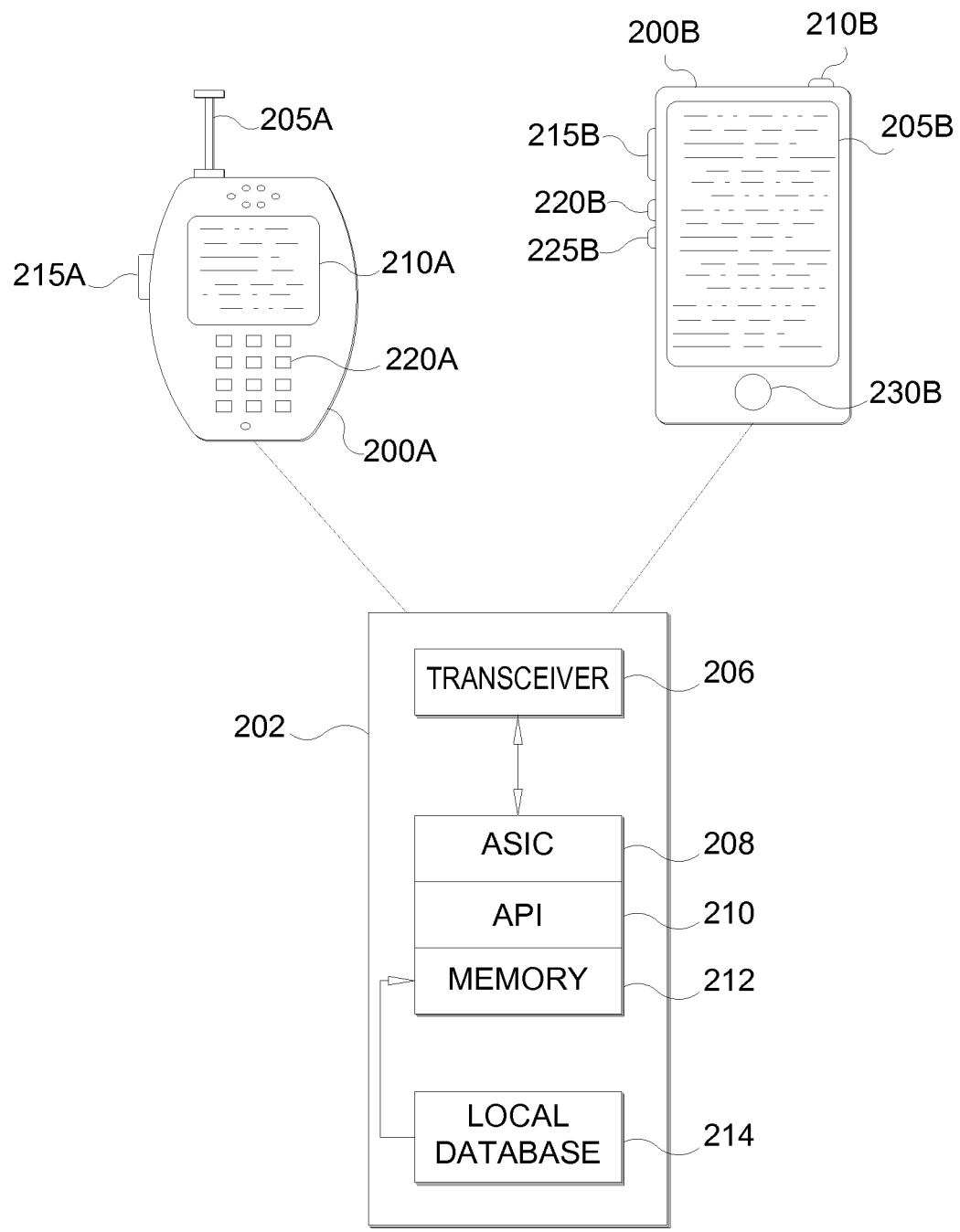
FIG. 2 illustrates examples of user equipments (UEs) in accordance with embodiments of the invention.

FIG. 2 illustrates examples of UEs (i.e., client devices) in accordance with embodiments of the invention. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the invention is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
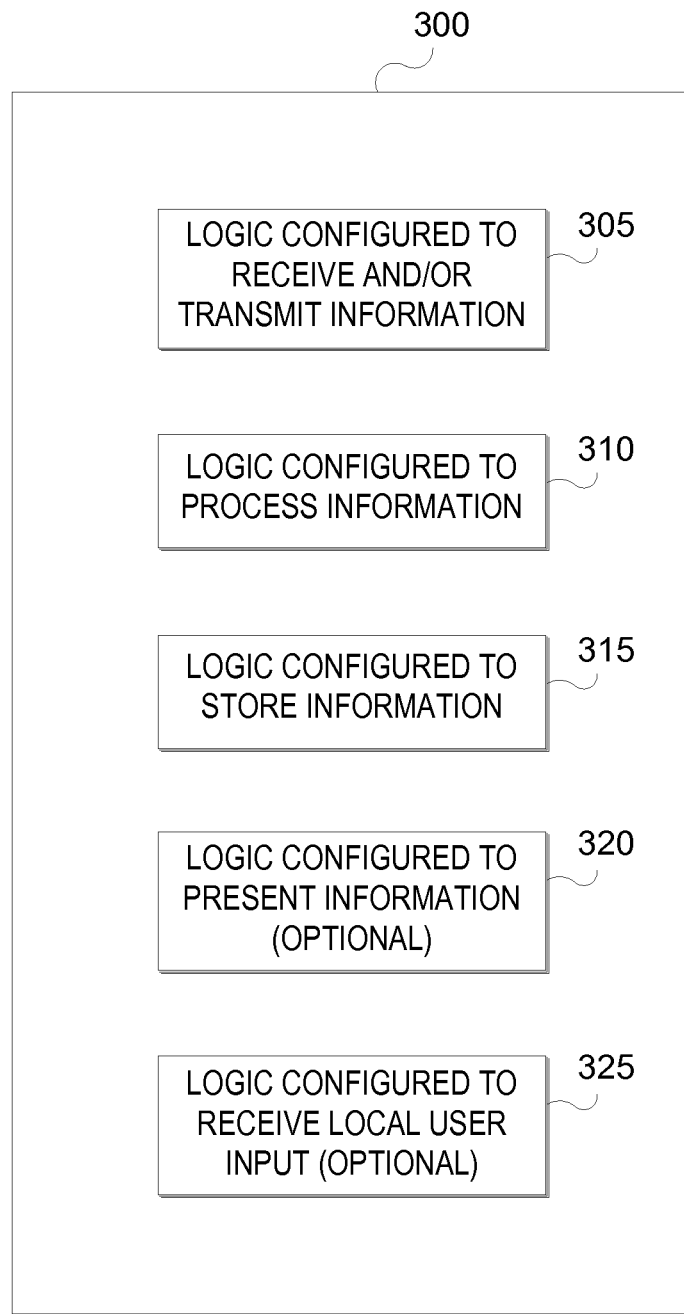
FIG. 3 illustrates a communication device that includes logic configured to perform functionality in accordance with an embodiment of the invention.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, AP 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, EPROM memory, EEPROM memory, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers such as the server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 4:
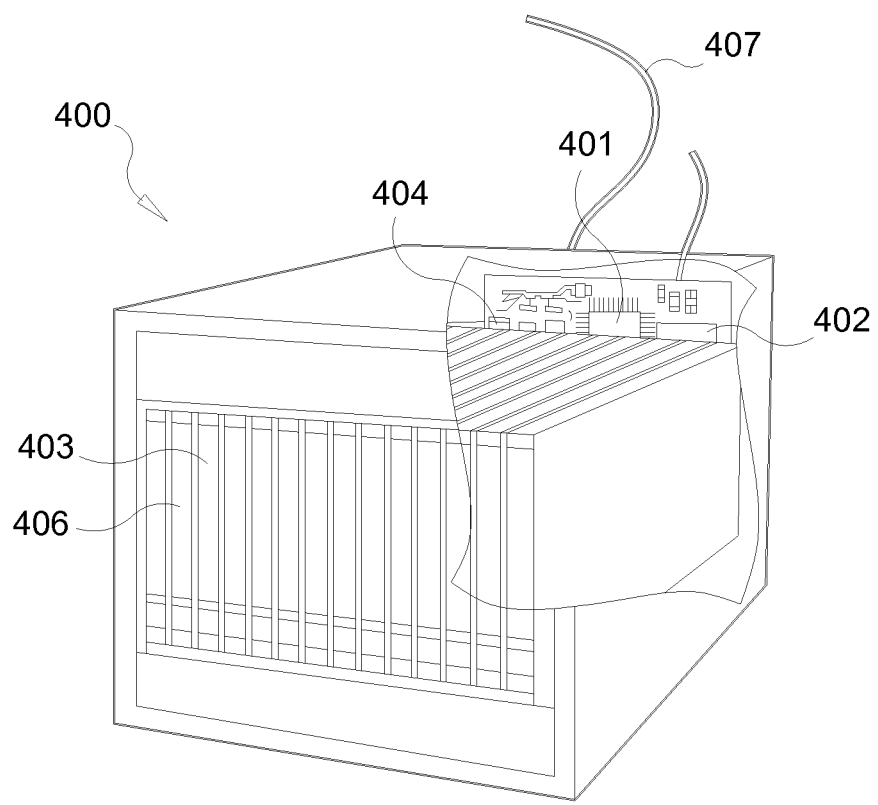
FIG. 4 illustrates a server in accordance with an embodiment of the invention.

The various embodiments may be implemented on any of a variety of commercially available server devices, such as server 400 illustrated in FIG. 4. In an example, the server 400 may correspond to one example configuration of the application server 170 described above. In FIG. 4, the server 400 includes a processor 400 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access ports 304 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to a UE implementation as in 205A or 205B as in FIG. 2.

Often, there is a business need for one client device to quickly exchange data (e.g., media, information or files, etc.) with other client device(s) in a "formal" way (e.g., as opposed to an "informal" peer-to-peer (P2P) exchange). However, such exchanges typically require the client device to acquire personal contact information (e.g., a unique user address at which a user can be contacted such as an email address, phone number, Skype Username, Facebook ID, LinkedIn ID, or a unique network address at which an associated UE can be contacted via a network such as a MAC ID, phone number, etc.). For example, assume that at a business luncheon attended by a small group of people, a luncheon participant takes a group photo and wants to share the group photo with each other attendee of the group luncheon. In this case, it is probably not practical for the luncheon participant to obtain the personal contact information of each other attendee. In another example, assume that a marketing person wants to hand out a digital information brochure to conference attendees. In this case, recipients of the digital information brochure may not want to browse the digital information brochure without divulging any personal contact information to the marketing person. Also, certain transactions can occur via P2P protocols specifically to avoid a formal record by their respective operators. For example, criminals may wish to exchange data files via P2P without form records of the data transfer being recorded.

Figure 5:
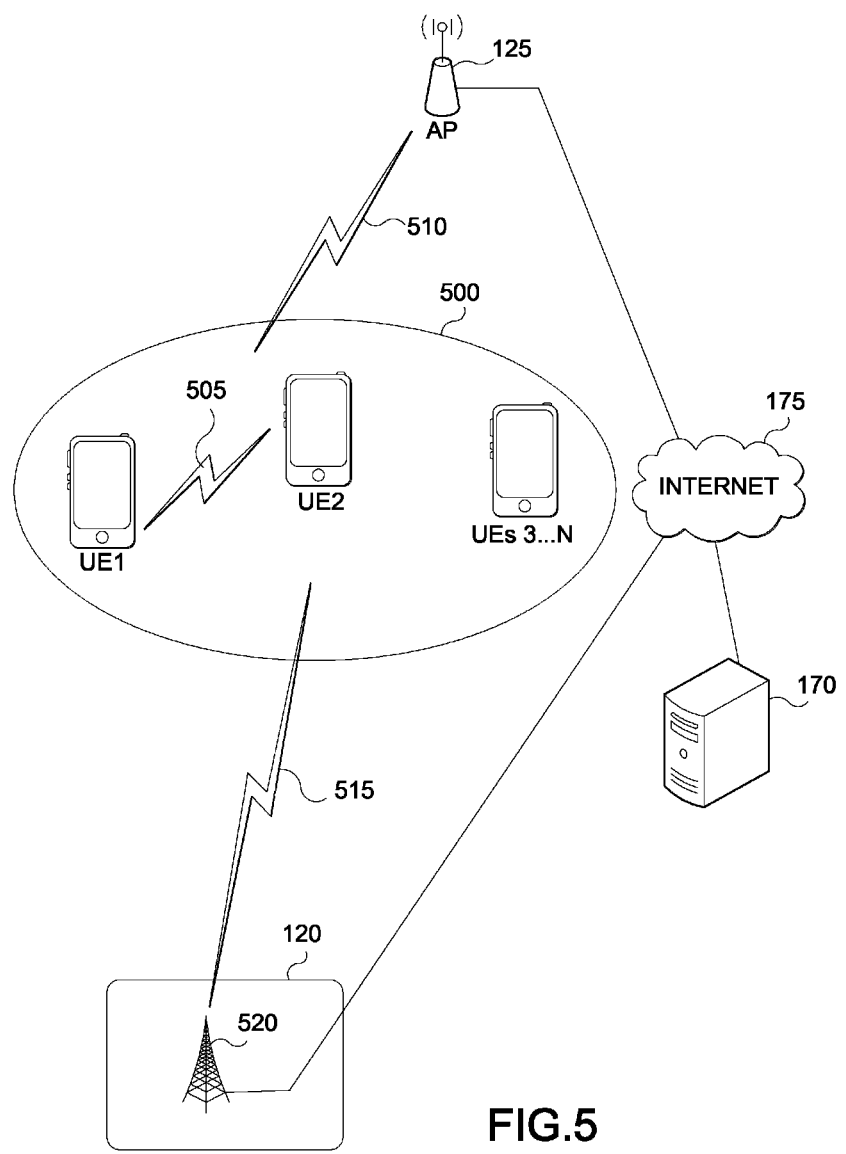
FIG. 5 illustrates a plurality of P2P-capable UEs (or client devices) being deployed in a communication environment in accordance with an embodiment of the invention.

FIG. 5 illustrates a plurality of P2P-capable UEs (or client devices) being deployed in a communication environment in accordance with an embodiment of the invention. In particular, UEs 1 . . . N are shown in FIG. 5 as being within a given P2P communication range 500 through which local, wireless P2P communication between any of UEs 1 . . . N is possible via a local P2P communication interface 505 (e.g., Bluetooth, WLAN, etc.). Further, one or more of UEs 1 . . . N are configured to connect to the AP 125 via a first network communication interface 510 (e.g., a WLAN communication interface), through which the respective UE(s) can connect to the Internet 175 and the application server 170. Also, one or more of UEs 1 . . . N (which are not necessarily the same as the AP-capable UEs) are configured to connect to a base station 520 (e.g., a macro base station, a femto base station, etc.) operated by the RAN 120 via a second network communication interface 515, through which the respective UE(s) can connect to the Internet 175 and the application server 170.

Figure 6:
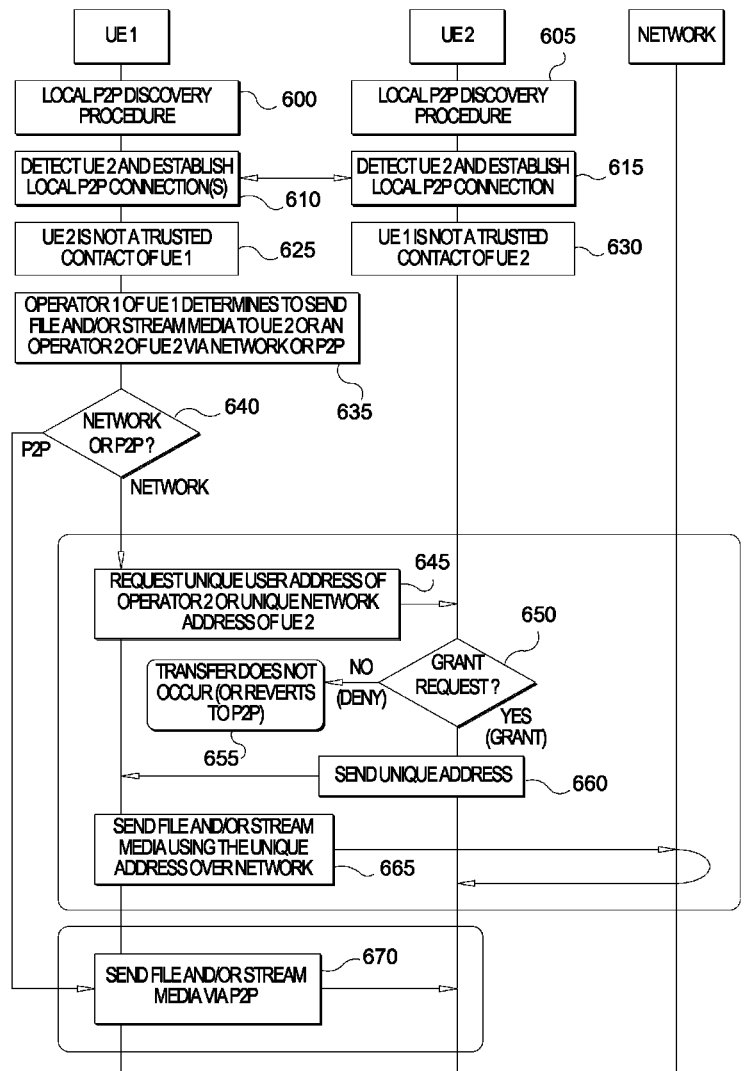
FIG. 6 illustrates a conventional process of exchanging data between UEs 1 . . . N in the communication environment of FIG. 5.

FIG. 6 illustrates a conventional process of exchanging data between UEs 1 . . . N in the communication environment of FIG. 5. Referring to FIG. 6, UEs 1 and 2 each execute a local P2P discovery procedure, 600 and 605. Based on the local P2P discovery procedures of 600 and 605, UEs 1 and 2 detect each other and form a local P2P connection through which P2P communication can be mediated, 610 and 615. For example, the local P2P discovery procedures of 600 through 615 can include UE 1 broadcasting an identifier (e.g., an SSID) via the local P2P communication interface 505 to announce UE 1, with UE 2 detecting UE 1's broadcasted SSID by monitoring the local P2P communication interface 505 (or vice versa), after which UEs 1 and 2 set-up the local P2P connection. At this point, while UEs 1 and 2 have established the local P2P connection, it is possible that UEs 1 and/or 2 determine that the other UE is not a trusted contact, 625 and 630. If UEs 1 and 2 are not recognized as trusted contacts of each other, any exchange of certain private information (e.g., an operator's unique user address or the UE's unique network address information) generally needs to be manually approved by a respective operator of UE 1 or UE 2 (i.e., whichever UE(s) are untrusting) prior to execution.

While UEs 1 and 2 remain connected via the local P2P connection, assume that an operator ("operator 1") of UE 1 determines to send a file and/or to stream media to UE 2 and/or an operator ("operator 2") of UE 2, 635. For example, operator 1 may desire to stream media to UE 2, or operator 1 may want to send a file to operator 2 (e.g., via email, etc.) without caring whether UE 2 itself actually receives the file (e.g., operator 1 may simply want the file accessible to operator 2 in a manner that is not device-specific, etc.). At 640, operator 1 selects either a network connection (e.g., the first network communication interface 510 or the second network communication interface 515, etc.) or the local P2P interface 505 as an interface on which to deliver the file and/or media stream.

Referring to 640, if operator 1 selects the network interface, UE 1 requests a unique user address of operator 2 and/or a unique network address of UE 2, 645, after which UE 2 prompts operator 2 to determine whether operator 2 is willing to grant the request. If operator 2 is determined to deny the request at 650, UE 1 does not obtain the requested address, 655. At this point, UE 1 can either attempt to deliver the file and/or media stream via the local P2P interface 505 or else can simply give up and stop attempting to deliver the file and/or media stream. Otherwise, if operator 2 is determined to grant the request at 650, UE 2 sends the requested address to UE 1, 660, and UE 1 delivers the file and/or media stream to UE 2 and/or operator 2 via the network interface based on the requested address, 665. Turning back to 640, if operator 1 selects the local P2P interface 505 instead of the network interface, UE 1 delivers the file and/or media stream to UE 2 via the local P2P connection established at 610 and 615, 670.

As will be discussed in more detail below with respect to FIG. 7, one or more embodiments of the invention are directed to implementing a server-mediated data transfer when a P2P-mediated data transfer is requested and when, ostensibly from the user or operator perspective, the data transfer occurs via P2P. In other words, a P2P-mediated data transfer is "redirected" to a server and delivered via the server without notifying the respective operators of the sender or the target(s) with respect to the server redirect aspect. In at least one embodiment, the server redirect function can be implemented in order to implement a monitoring (e.g., wiretapping) function to permit law enforcement to track data transfers that would otherwise be conducted anonymously via P2P or based on other criteria that function to override an operator's P2P-specific data transfer request for delivery via the server.

Figure 7:
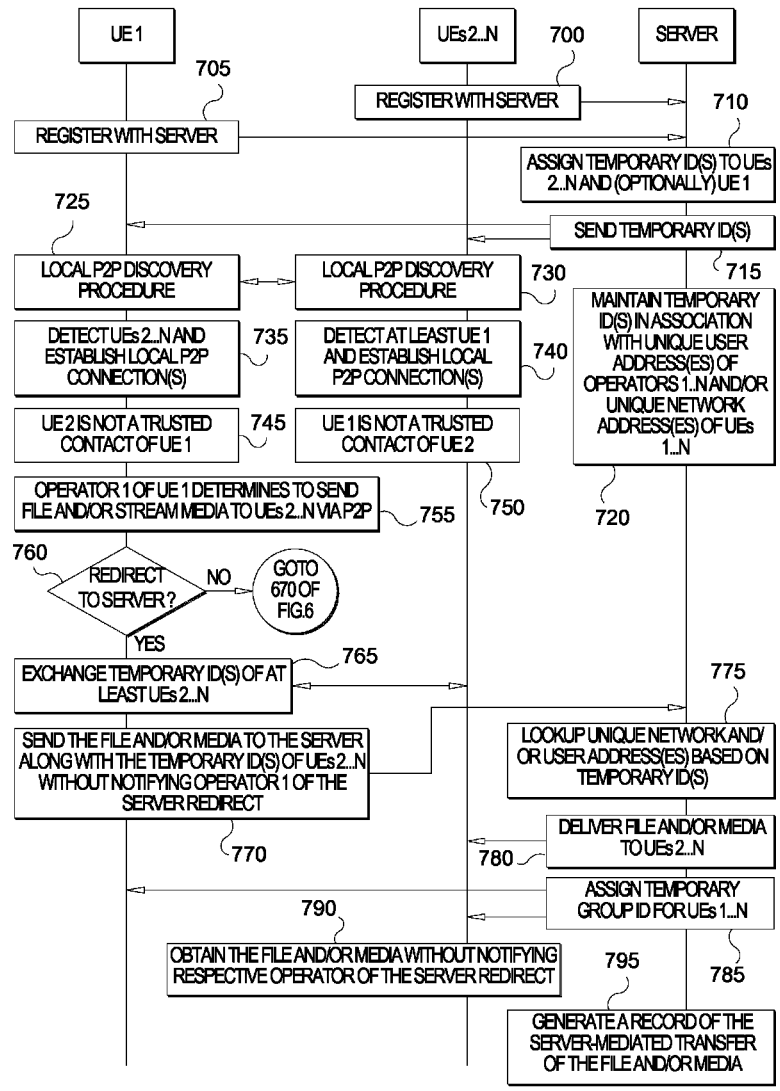
FIG. 7 illustrates a process of implementing a P2P-initiated data transfer in conjunction with a server redirect in accordance with an embodiment of the invention.

FIG. 7 illustrates a process of implementing a P2P-initiated data transfer in conjunction with a server redirect in accordance with an embodiment of the invention. Referring to FIG. 7, UEs 2 . . . N register with a server, such as the application server 170, via an Internet connection, 700. In the embodiment of FIG. 7, the server registers one or more unique user addresses and/or network addresses for UEs 2 . . . N by which the server can contact UEs 2 . . . N and/or their respective operators. UE 1 also optionally registers itself with the server at 705, similar to 700. The server assigns temporary ID(s) to UEs 2 . . . N and also (optionally) to UE 1, 710, and then reports the temporary ID(s) to UEs 2 . . . N and (optionally) to UE 1, 715. In an example, the temporary ID(s) may be sent at 715 along with instructions governing how the temporary ID(s) are exchanged among P2P-connected UE(s), as well as instructions for triggering when a P2P-initiated data transfer is to be redirected to the server along with an indication of the associated temporary ID. Alternatively, the instructions can be pre-installed onto one or more of UEs 1 . . . N. After assigning the temporary ID(s) to UEs 1 . . . N, the server maintains (e.g., generates or updates) a table that maps temporary IDs to corresponding unique user addresses and/or unique network addresses through which an associated UE or associated operator may be contacted via a network interface.

At some later point in time, assume that UEs 1 . . . N each enter the given P2P communication range 500 shown in FIG. 5. While UEs 1 . . . N are within the given P2P communication range 500, UEs 1 . . . N each execute a local P2P discovery procedure, 725 and 730 (e.g., similar to 600 through 605 of FIG. 6, respectively). Based on the local P2P discovery procedures of 725 and 730, UEs 1 . . . N detect each other and form one or more local P2P connections through which P2P communication can be mediated, 735 and 740. For example, the local P2P discovery procedures of 735 and 740 can include UE 1 broadcasting an identifier (e.g., an SSID, an assigned temporary ID, etc.) via the local P2P communication interface 505 to announce UE 1, with UE 2 detecting UE 1's broadcasted SSID by monitoring the local P2P communication interface 505 (or vice versa), after which UEs 1 and 2 set-up the local P2P connection. This process can then repeat for any additional P2P-capable UEs in the given P2P communication range 500. At this point, while UEs 1 . . . N have established the local P2P connection(s), it is possible that UEs 1 . . . N determine that one or more other UEs are not trusted contacts, 745 and 750. If UEs 1 . . . N do not recognize one or more other UEs as trusted contacts, any exchange of certain private information (e.g., an operator's unique user address or the associated UE's unique network address information) generally needs to be manually approved by a respective operator of a respective UE (i.e., whichever UE(s) are untrusting) prior to execution.

While UEs 1 . . . N remain connected via the local P2P connection(s), assume that an operator ("operator 1") of UE 1 determines to send a file and/or to stream media to UEs 2 . . . N and/or to respective operators ("operators 2 . . . N") of UEs 2 . . . N, 755. For example, operator 1 may desire to stream media to UEs 2 . . . N. Unlike 635 of FIG. 6, assume at 755 that operator 1 of UE 1 indicates that he/she wishes to implement the transfer of the file and/or media stream via the local P2P connection(s) (e.g., by selecting P2P as the target interface similar to 640, etc.).

In response to the detection of the operator-requested P2P transfer at 755, UE 1 determines whether to intercept the P2P transfer and to redirect the file and/or media stream to the server, 760. The determination of 760 can be performed in a variety of different ways. For example, UE 1 may be provisioned with server redirect instructions (e.g., downloaded in conjunction with the temporary ID at 715 or via some separate provisioning procedure) that instruct UE 1 to intercept (i) all P2P transmissions initiated by UE 1 (e.g., a law enforcement agency has a warrant for a wiretap for UE 1 and/or operator 1), (ii) P2P transmissions from UE 1 directed to designated target UEs 1 (e.g., a law enforcement agency has a warrant for a wiretap for the designated target UEs and/or their associated operators, (iii) P2P transmissions including a particular media type (e.g., audio, video, encrypted data files, copyrighted materials, etc.), (iv) P2P transmissions that occur at a particular time of day and/or at a particular location (e.g., inside of a house for which a law enforcement agency has a wiretap warrant), (v) P2P transmissions that satisfy P2P override rules that can be specified by an operator (e.g., an operator may want any songs to be transferred via the server to maintain a record even if the operator later forgets about this rule and asks for the songs to be P2P-transferred) or some other entity (e.g., an IT administrator can establish the P2P override rules as part of enterprise policies to be applied to devices operated by one or more enterprise users) or (vi) any combination thereof.

If UE 1 determines not to redirect the file and/or media stream to the server at 760, the process advances to 670 of FIG. 6 and the P2P transfer is allowed to proceed without the server redirect. Otherwise, if UE 1 determines to redirect the file and/or media stream to the server at 760, UE 1 obtains temporary ID(s) for UEs 2 . . . N at 765. At 765, UE 1 may also optionally send its own temporary ID to any of UEs 2 . . . N. Also, the temporary ID exchange shown at 765 can alternatively be implemented at an earlier point in time, such as when the local P2P connections are established at 735 and 740 and/or during the local P2P discovery procedure at 725 and 730 (e.g., by setting the temporary ID equal to a broadcasted SSID identifying a respective UE, etc.).

Referring to FIG. 7, after obtaining the temporary ID(s) of UEs 2 . . . N, UE 1 transmits the file and/or media stream to the server along with the temporary ID(s) of UEs 2 . . . N without notifying operator 1 of the server redirect, 770. In other words, operator 1 requested a P2P-mediated data transfer but, unbeknownst to operator 1, the data transfer is redirected to the server as a server-mediated data transfer. As will be appreciated, this deception may involve user interface (UI) alternations (e.g., a "4G" or "3G" indicator on UE 1 may be blocked and a "P2P" identifier may be shown instead, making it appear to operator 1 as if the data transfer is actually occurring via P2P when this is in fact not true). The server looks up the unique network address and/or unique user address based on the temporary ID(s) received from UE 1, 775, and then delivers the file and/or media stream to UEs 2 . . . N, 780. Optionally, if the server-mediated data transfer is a group communication (i.e., N is greater than 2 such that the file and/or media stream is sent to multiple target UEs), the server may assign a temporary group ID to UEs 1 . . . N so that any subsequent data transfer received at the server containing the temporary group ID will be mapped to UEs 1 . . . N as a communication group, 785 (e.g., so that a data transfer from UE 3 attaching the temporary group ID is delivered to each other UE from UEs 1 . . . N, and so on) without the need to separately list the individual temporary ID of each target UE. So, the server itself can map the temporary group ID to the individual temporary IDs which are in turn mapped to the unique user addresses and/or unique network addresses of the various UEs and/or operators.

At 790, UEs 2 . . . N receive the file and/or media stream from the server without notifying their respective operators of the server redirect. For example, similar to the operator 1 deception noted above, UI alternations may be leveraged to facilitate the P2P deception at UEs 2 . . . N as well (e.g., a "4G" or "3G" indicator on UEs 2 . . . N may be blocked and a "P2P" identifier may be shown instead, making it appear to operators 2 . . . N as if the data transfer is actually occurring via P2P when this is in fact not true).

At 795, the server generates a record of the server-mediated transfer of the file and/or media stream. While not shown explicitly in FIG. 7, records generated at 795 may be archived or stored in a database maintained by the server, and the server (or an administrator of the server) may later receive data requests for one or more of the records. For example, a law enforcement agency with an appropriate warrant may request all video streams originated by UE 4, or all text messages received but UE 2 in a particular date-range, or all emails sent to a particular email address from any of UEs 1 . . . N, and so on. In a further example, the record generated at 795 can be forwarded to a separate monitoring server in addition to or in place of the record being locally stored at the server. The decision of the server to forward certain records to the separate monitoring server can be based on one or more record forwarding policies executed by the server. For example, if the FBI has a wiretapping warrant related to a particular user's communications, any records associated with the particular user (e.g., files and/or media streams sent to/from the particular user) can be forwarded to a monitoring server operated by the FBI in real-time, where the forwarded records are available for inspection by the FBI.

Figure 8:
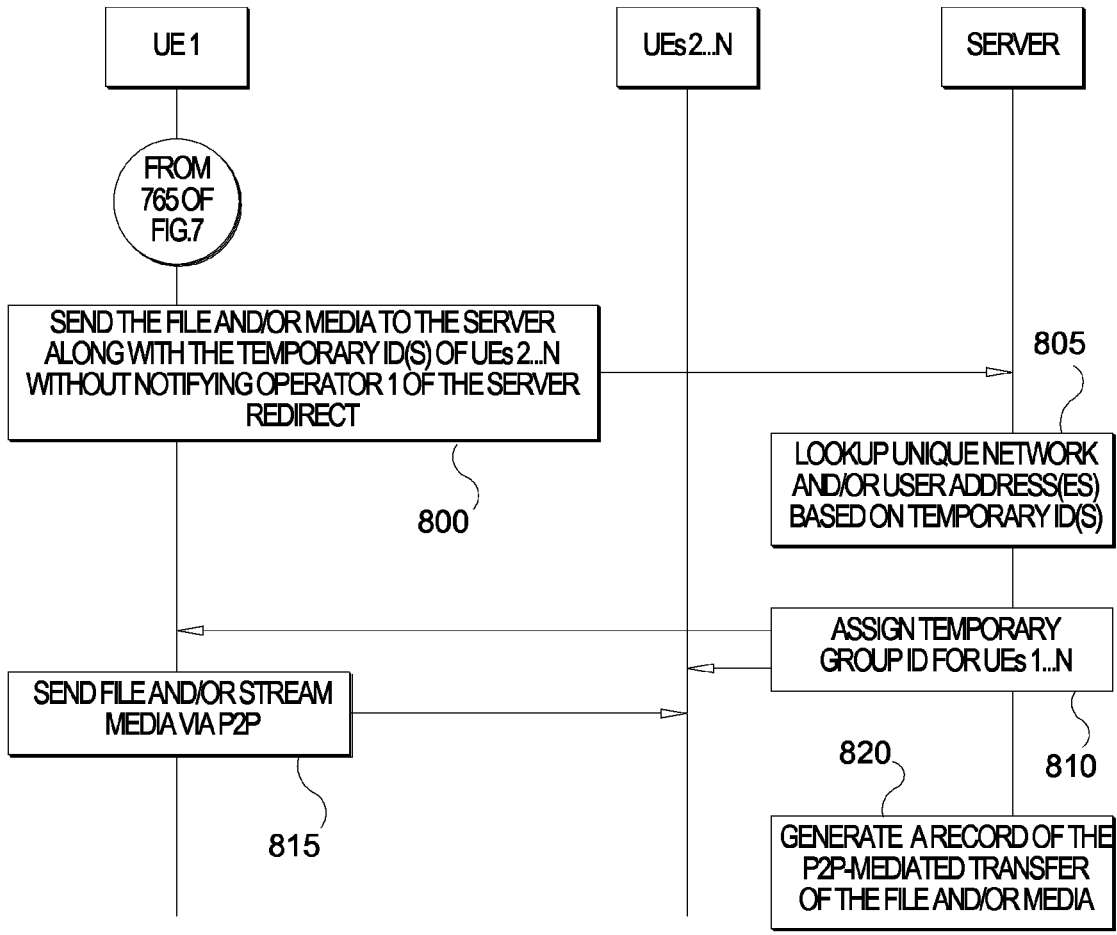
FIG. 8 illustrates an alternative implementation of the process of FIG. 7 whereby the server redirect occurs in addition to a P2P-mediated data transfer in accordance with an embodiment of the invention.

While FIG. 7 illustrates an example implementation whereby the server redirect occurs in place of the requested P2P-mediated data transfer, FIG. 8 is directed to an alternative implementation whereby the server redirect occurs in addition to the P2P-mediated data transfer.

Referring to FIG. 8, after obtaining the temporary ID(s) of UEs 2 . . . N at 765, UE 1 transmits the file and/or media stream to the server along with the temporary ID(s) of UEs 2 . . . N without notifying operator 1 of the server redirect, 800 (e.g., similar to 770 of FIG. 7), the server looks up the unique network address and/or unique user address based on the temporary ID(s) received from UE 1, 805 (e.g., similar to 775 of FIG. 7) and the server optionally assigns the temporary group ID to UEs 1 . . . N if the server-mediated data transfer is a group communication, 810 (e.g., similar to 785 of FIG. 7). In FIG. 8, instead of having the server deliver the file and/or media stream to UEs 2 . . . N as in FIG. 7, UE 1 sends the file and/or media stream to UEs 2 . . . N via the local P2P connection(s) from 735 and 740, 815. In this case, UE 1 merely needs to hide the fact that the file and/or media stream is also being sent to the server instead of bypassing the P2P data transfer itself, and UEs 2 . . . N merely know that the file and/or media stream has occurred via P2P without knowing about the server redirect that occurred at 800. In this case, the server generates a record of the server-mediated transfer of the file and/or media stream based on the temporary ID lookup operation from 805, 820 (e.g., similar to 795 of FIG. 7). As noted above with respect to 795, in a further example, the record generated at 820 can be forwarded to a separate monitoring server in addition to or in place of the record being locally stored at the server. The decision of the server to forward certain records to the separate monitoring server can be based on one or more record forwarding policies executed by the server. For example, if the FBI has a wiretapping warrant related to a particular user's communications, any records associated with the particular user (e.g., files and/or media streams sent to/from the particular user) can be forwarded to a monitoring server operated by the FBI in real-time, where the forwarded records are available for inspection by the FBI.

While FIGS. 7-8 relate to embodiments whereby a server redirect that occurs in a manner that is transparent to operators of sending and/or receiving devices for a data transfer, other embodiments of the invention relate to server-mediated data transfers that are not necessarily deceptive in terms of the server redirect. In particular, FIGS. 9-10 are directed to defining a P2P-connected communication state for two or more UEs to implement non-P2P communication between the respective UEs even when the UEs are no longer P2P-connected.

Figure 9:
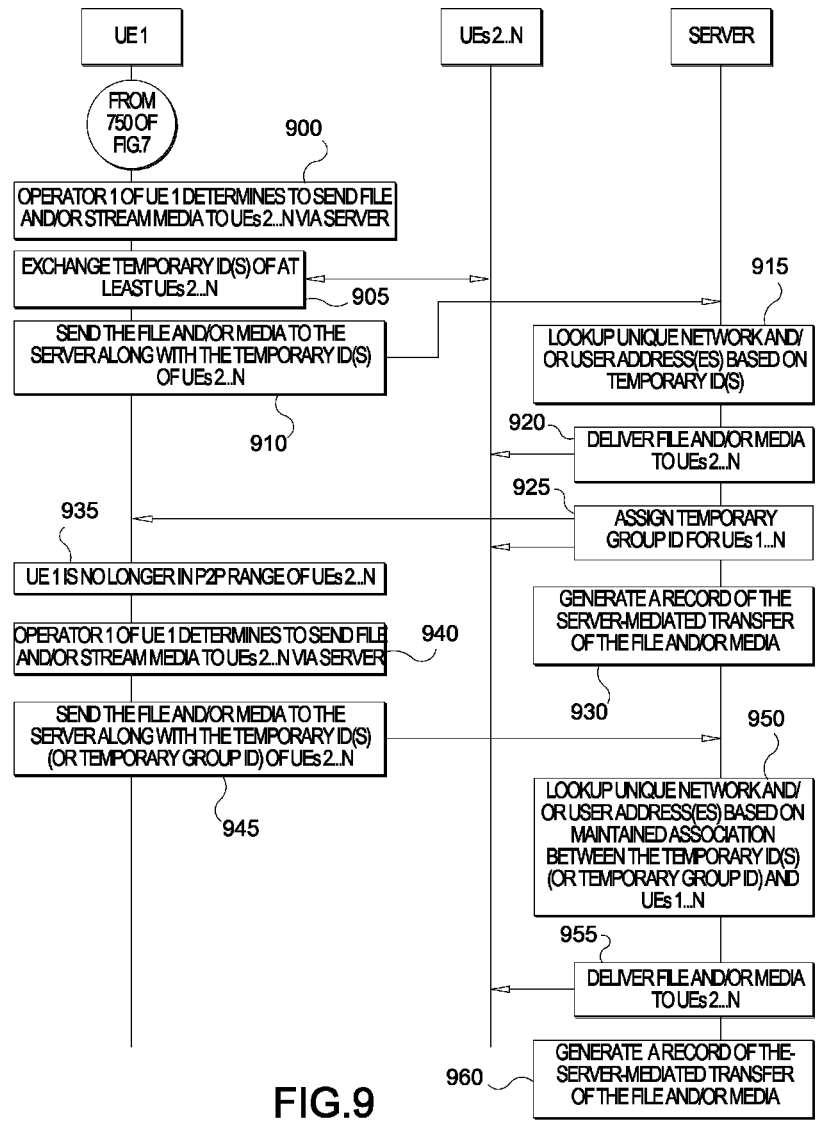
FIG. 9 illustrates a process of defining a P2P-connected communication state for two or more UEs to implement non-P2P communication between the respective UEs even when the UEs are no longer P2P-connected in accordance with an embodiment of the invention.
Figure 10:
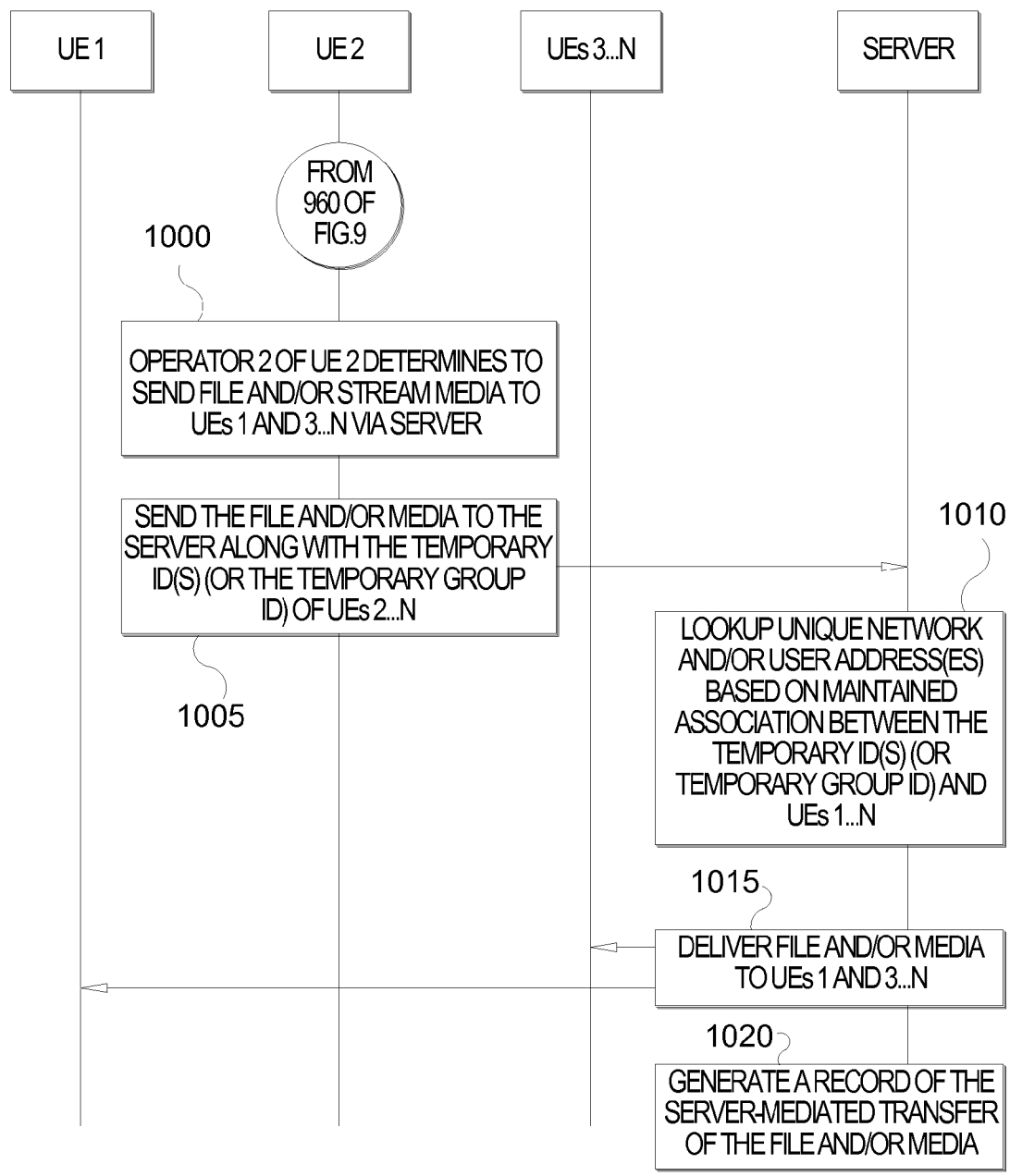
FIG. 10 illustrates a continuation of the process of FIG. 9 in accordance with an embodiment of the invention.

With reference to FIG. 9, assume that 700-750 have already been executed, after which UEs 1 . . . N remain connected via the local P2P connection(s) established at 735 and 740. Next, assume that an operator ("operator 1") of UE 1 determines to send a file and/or to stream media to UEs 2 . . . N and/or to respective operators ("operators 2 . . . N") of UEs 2 . . . N, 900. For example, operator 1 may desire to stream media to UEs 2 . . . N. Unlike 755 of FIG. 7, assume at 900 that operator 1 of UE 1 indicates that he/she wishes to implement the transfer of the file and/or media stream via the server (e.g., by selecting the network interface as the target interface similar to 640, etc.).

In response to the detection of the operator-requested server-mediated data transfer at 900, UE 1 obtains temporary ID(s) for UEs 2 . . . N at 905 (e.g., similar to 765 of FIG. 7). Similar to 765 of FIG. 7, at 905, UE 1 may also optionally send its own temporary ID to any of UEs 2 . . . N. Also, the temporary ID exchange shown at 905 can alternatively be implemented at an earlier point in time, such as when the local P2P connections are established at 735 and 740 and/or during the local P2P discovery procedure at 725 and 730 (e.g., by setting the temporary ID equal to a broadcasted SSID identifying a respective UE, etc.).

Referring to FIG. 9, after obtaining the temporary ID(s) of UEs 2 . . . N, UE 1 transmits the file and/or media stream to the server along with the temporary ID(s) of UEs 2 . . . N, 910. 910 of FIG. 9 is similar to 770 of FIG. 7, except that the transmission of 910 does not necessarily need to occur without notifying operator 1 of the server-mediated implementation of the data transfer. The server looks up the unique network address and/or unique user address based on the temporary ID(s) received from UE 1, 915 (e.g., similar to 775 of FIG. 7), and then delivers the file and/or media stream to UEs 2 . . . N, 920 (e.g., similar to 780 of FIG. 7). Optionally, if the server-mediated data transfer is a group communication (i.e., N is greater than 2 such that the file and/or media stream is sent to multiple target UEs), the server may assign a temporary group ID to UEs 1 . . . N so that any subsequent data transfer received at the server containing the temporary group ID will be mapped to UEs 1 . . . N as a communication group, 925, without the need to separately list the individual temporary ID of each target UE (e.g., similar to 785 of FIG. 7). So, the server itself can map the temporary group ID to the individual temporary IDs which are in turn mapped to the unique user addresses and/or unique network addresses of the various UEs and/or operators.

At 930, the server generates a record of the server-mediated transfer of the file and/or media stream (e.g., similar to 795 of FIG. 7). While not shown explicitly in FIG. 7, records generated at 930 may be archived in a local or remote database, and the server (or an administrator of the server) may later receive data requests for one or more of the records. For example, in a non-wiretapping scenario, one or more of UEs 1 . . . N may request a copy of one or more archived records.

At some later point in time, assume that UE 1 is no longer within the given P2P communication range 500 such that the local P2P connection(s) established at 735 are terminated, 935 (e.g., although if N is greater than 2, separate local P2P connections established at 740 could be maintained, such as between UEs 2 and 3, etc.). Assume that the server maintains the association between the temporary ID(s) and UEs 2 . . . N and/or the temporary group ID and UEs 1 . . . N from 930 even after the P2P disconnection. Next, operator 1 of UE 1 determines to send an additional file and/or to stream additional media to UEs 2 . . . N and/or to respective operators ("operators 2 . . . N") of UEs 2 . . . N, 940. At this point, a P2P transfer of the additional file and/or media stream from UE 1 to UEs 2 . . . N is not possible. Thereby, instead of attempting a P2P transfer, UE 1 transmits the additional file and/or media stream to the server along with either (i) the temporary ID(s) of UEs 2 . . . N obtained at 905, or (ii) the temporary group ID optionally obtained at 925, 945. In a further example, the determination of 940 can occur when either operator 1 is controlling UE 1 as illustrated in FIG. 9, or alternatively while operator 1 is controlling some other UE in an example. For example, UE 1 may correspond to a tablet PC operated by operator 1 during a meeting with operators of UEs 2 . . . N between 900-925. Later, operator 1 is operating a different UE (e.g., a cell phone) and wants to send the data determined at 940. In this case, 940-945 may be performed via the cell phone instead of the tablet PC, so the UE performing different parts of the above-noted processes need not stay the same throughout the respective processes in at least one embodiment.

The server looks up the unique network address and/or unique user address based on the temporary ID(s) (or temporary group ID) received from UE 1, 950, and then delivers the additional file and/or media stream to UEs 2 . . . N and/or their respective operators, 955. In other words, the delivery of 955 does not actually need to be directly delivered to UEs 2 . . . N, although this is certainly possible. For example, if operator 2 has a unique user address (e.g., email address or Skype Username) maintained by the server in association with its temporary ID, the server can forward the additional file and/or media stream to the email address or Skype Username, and if operator 2 is operating a different UE (e.g., UE X) then operator 2 may actually receive the additional file and/or media stream on UE X instead of UE 2. At 960, the server generates a record of the server-mediated transfer of the additional file and/or media stream (e.g., similar to 930). As noted above with respect to 795 of FIGS. 7 and 820 of FIG. 8, in a further example, the record generated at 930 and/or 960 can be forwarded to a separate monitoring server in addition to or in place of the record being locally stored at the server. The decision of the server to forward certain records to the separate monitoring server can be based on one or more record forwarding policies executed by the server. For example, if the FBI has a wiretapping warrant related to a particular user's communications, any records associated with the particular user (e.g., files and/or media streams sent to/from the particular user) can be forwarded to a monitoring server operated by the FBI in real-time, where the forwarded records are available for inspection by the FBI. The server-mediated data transfer that occurs between 935 and 960 in FIG. 9 is based on a stored mapping between the temporary ID(s) of UEs 2 . . . N (or the temporary group ID) and the respective unique user addresses of operators 2 . . . N and/or network addresses of UEs 2 . . . N after UE 1 is out of P2P range with UEs 2 . . . N. However, server-mediated data transfers can also be directed back to UE 1, as shown in FIG. 10.

Referring to FIG. 10, assume that N is greater than 2 such that UEs 1 . . . N includes at least UE 3. After 960 of FIG. 9, while UE 1 is no longer within the given P2P communication range 500 such that the local P2P connection(s) established at 735 are terminated, assume that operator 2 determines to send a file and/or to stream additional media to UEs 1 and 3 . . . N and/or to respective operators ("operators 1 and 3 . . . N") of UEs 2 . . . N, 1000. At this point, a P2P transfer of the additional file and/or media stream from UE 2 to UE 1 is not possible (although in theory UE 2 could retain local P2P connections with UEs 3 . . . N depending on the circumstances). Thereby, instead of attempting a P2P transfer, UE 2 transmits the file and/or media stream to the server along with either (i) the temporary ID(s) of UEs 1 and 3 . . . N obtained at 905, or (ii) the temporary group ID optionally obtained at 925, 1005. In a further example, the transmission of 1000 can occur when operator 2 is controlling UE 2 as illustrated in FIG. 10, or some alternatively while operator 2 is controlling some other UE in an example. For example, UE 2 may correspond to a tablet PC operated by operator 2 during a meeting with operators of UEs 1 and 3 . . . N between 900-925. Later, operator 2 is operating a different UE (e.g., a cell phone) and wants to send the data determined at 1000. In this case, 1000-1005 may be performed via the cell phone instead of the tablet PC, so the UE performing different parts of the above-noted processes need not stay the same throughout the respective processes in at least one embodiment.

The server looks up the unique network addresses and/or unique user addresses based on the temporary ID(s) (or temporary group ID) received from UE 2, 1010, and then delivers the additional file and/or media stream to UEs 1 and 3 . . . N and/or their respective operators, 1015. In other words, the delivery of 1015 does not actually need to be directly delivered to UEs 1 and 3 . . . N, although this is certainly possible. For example, if operator 3 has a unique user address (e.g., email address or Skype Username) maintained by the server in association with its temporary ID, the server can forward the additional file and/or media stream to the email address or Skype Username, and if operator 3 is operating a different UE (e.g., UE X) then operator 3 may actually receive the additional file and/or media stream on UE X instead of UE 3. At 1020, the server stores a record of the server-mediated transfer of the additional file and/or media stream (e.g., similar to 960). As noted above with respect to 795 of FIG. 7, 820 of FIG. 8, 930 of FIGS. 9 and 960 of FIG. 9, in a further example, the record generated at 1020 can be forwarded to a separate monitoring server in addition to or in place of the record being locally stored at the server. The decision of the server to forward certain records to the separate monitoring server can be based on one or more record forwarding policies executed by the server. For example, if the FBI has a wiretapping warrant related to a particular user's communications, any records associated with the particular user (e.g., files and/or media streams sent to/from the particular user) can be forwarded to a monitoring server operated by the FBI in real-time, where the forwarded records are available for inspection by the FBI.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a first client device configured to connect to a serving network, comprising:
   detecting a second client device with which the first client device can communicate via a local peer-to-peer (P2P) interface that is independent of the serving network;
   establishing a local P2P connection between the first client device and the second client device via the local P2P interface;
   receiving, over the local P2P connection, a temporary identifier for the second client device, wherein the temporary identifier is insufficient for the first client device to identify any unique network address at which the second client device can be contacted via the serving network;
   receiving a request from an operator of the first client device to transmit data to the second client device over the local P2P connection; and
   sending, in response to the request while the local P2P connection remains available for communications between the first client device and the second client device, the data to a server via the serving network along with an indication of the temporary identifier without notifying the operator of the first client device that the data is being sent to the server,
   wherein the data is redundantly transmitted to the second client device via the local P2P connection, or wherein the data is not redundantly transmitted to the second client device via the local P2P connection.

2. The method of claim 1, wherein the data is redundantly transmitted to the second client device via the local P2P connection.

3. The method of claim 1, wherein the data is not redundantly transmitted to the second client device via the local P2P connection.

4. The method of claim 1, wherein the server is expected to lookup a unique network address at which the second client device can be contacted via the serving network based on the indication of the temporary identifier in order to forward the data to the second client device via the serving network.

5. The method of claim 1, further comprising:
   configuring a user interface (UI) to falsely indicate that the data is sent to the server via the local P2P connection instead of the serving network.

6. The method of claim 5, wherein the configuring includes blocking a cellular indicator from display in the configured UI and displaying a P2P indicator in the configured UI.

7. The method of claim 1, wherein the data corresponds to one or more files and/or one or more real-time media streams.

8. The method of claim 1, further comprising:
   analyzing the request to determine whether to execute a server redirect of the data to the server based on a set of server redirect instructions,
   wherein the sending of the data to the server occurs in response to the analyzing.

9. The method of claim 8, wherein the set of server redirect instructions instruct the first client device to redirect (i) each P2P transmission initiated by the first client device, (ii) one or more P2P transmissions from the first client device to a particular set of target client devices, (iii) one or more P2P transmissions including a transfer of a particular media type, (iv) one or more P2P transmissions that occur at a particular time of day and/or at a particular location, (v) one or more P2P transmissions that satisfy a set of P2P override rules or (vi) any combination thereof.

10. A method of operating a server, comprising:
    registering a unique network address at which a first client device can be contacted via a serving network;

assigning, to the first client device, a temporary identifier that is insufficient for other client devices to identify the registered unique network address;

receiving, from a second client device while the first client device and the second client device are connected via a local peer-to-peer (P2P) connection, data to be transmitted to the first client device along with an indication of the temporary identifier;

associating the indication of the temporary identifier with the registered unique network address; and generating a record of the data transmission between the first client device and the second client device based on the association, wherein the generating is performed without forwarding the data to the first client device based on a first expectation that the data transmission will occur via the local P2P connection between the first client device and the second client device, or wherein the method further comprises forwarding the data to the first client device based on a second expectation that the data transmission will not occur via the local P2P connection between the first client device and the second client device.

11. The method of claim 10, wherein the generating is performed without forwarding the data to the first client device based on the first expectation that the data transmission will occur via the local P2P connection between the first client device and the second client device.

12. The method of claim 10, further comprising:
forwarding the data to the first client device based on the second expectation that the data transmission will not occur via the local P2P connection between the first client device and the second client device.

13. The method of claim 10, further comprising:
locally storing the record at memory maintained by the server.

14. The method of claim 10, further comprising:
forwarding the record to at least one external server based on one or more record forwarding policies.

15. The method of claim 10, wherein the data corresponds to one or more files and/or one or more real-time media streams.

16. A method of operating a server, comprising:
registering, by the server, a unique contact address (i) at which a first client device can be contacted via a serving network or (ii) at which an operator of the first client device can be contacted;

assigning, by the server to the first client device, a temporary identifier that is insufficient for other client devices to identify the registered unique contact address;

receiving, by the server from a second client device while the first client device and the second client device are connected via a local peer-to-peer (P2P) connection, a request for data to be transmitted to the first client device and/or the operator of the first client device along with an indication of the temporary identifier;

delivering, by the server, the data to the first client device and/or the operator of the first client device using the registered unique contact address while the first client device and the second client device remain connected via the local P2P connection;

maintaining, by the server, an association between the temporary identifier and the first client device after the first client device and the second client device disconnect from the local P2P connection to permit supplemental communication between (i) the second client device and/or an operator of the second client device, and (ii) the first client device and/or the operator of the first client device.

17. The method of claim 16, further comprising:
receiving, from a given device operated by the operator of the second client device, a supplemental request for supplemental data to be transmitted to the first client device and/or the operator of the first client device along with another indication of the temporary identifier; and delivering the supplemental data to the first client device and/or the operator of the first client device using the registered unique contact address while the first client device and the second client device remain disconnected from the local P2P connection.

18. The method of claim 17, wherein the given device is the second client device or another client device associated with the operator of the second client device.

19. The method of claim 17, wherein the temporary identifier is a temporary group identifier that is configured to be mapped to unique contact addresses of multiple different client devices and/or operators, and wherein the data and the supplemental data are delivered to one or more additional client devices and/or client device operators in addition to the first client device and/or the operator of the first client device.

20. The method of claim 16, wherein the maintaining further maintains another unique contact address at which the second client device can be contacted via the serving network and/or at which the operator of the second client device can be contacted.

21. The method of claim 20, further comprising:
receiving, from a given device operated by the operator of the first client device, a supplemental request for supplemental data to be transmitted to the second client device and/or the operator of the second client device along with another indication of the temporary identifier; and delivering the supplemental data to the second client device and/or the operator of the second client device using the another unique contact address while the first client device and the second client device remain disconnected from the local P2P connection.

22. The method of claim 21, wherein the given device is the first client device or another client device associated with the operator of the first client device.

23. The method of claim 21, wherein the temporary identifier is a temporary group identifier that is configured to be mapped to unique contact addresses of multiple different client devices and/or operators, and wherein the data and the supplemental data are delivered to one or more additional client devices and/or client device operators in addition to the second client device and/or the operator of the second client device.

24. A server, comprising:
a processor, memory and/or transceiver configured to:
register a unique contact address (i) at which a first client device can be contacted via a serving network or (ii) at which an operator of the first client device can be contacted;

assign, to the first client device, a temporary identifier that is insufficient for other client devices to identify the registered unique contact address;

receive, from a second client device while the first client device and the second client device are connected via a local peer-to-peer (P2P) connection, a request for data to be transmitted to the first client device and/or the operator of the first client device along with an indication of the temporary identifier;

deliver the data to the first client device and/or the operator of the first client device using the registered unique contact address while the first client device and the second client device remain connected via the local P2P connection;

maintain an association between the temporary identifier and the first client device after the first client device and the second client device disconnect from the local P2P connection to permit supplemental communication between (i) the second client device and/or an operator of the second client device, and (ii) the first client device and/or the operator of the first client device.

25. The server of claim 24, wherein the processor, memory and/or transceiver are further configured to:
receive, from a given device operated by the operator of the second client device, a supplemental request for supplemental data to be transmitted to the first client device and/or the operator of the first client device along with another indication of the temporary identifier; and
deliver the supplemental data to the first client device and/or the operator of the first client device using the registered unique contact address while the first client device and the second client device remain disconnected from the local P2P connection.

26. The server of claim 25, wherein the temporary identifier is a temporary group identifier that is configured to be mapped to unique contact addresses of multiple different client devices and/or operators, and wherein the data and the supplemental data are delivered to one or more additional client devices and/or client device operators in addition to the first client device and/or the operator of the first client device.

27. The server of claim 24, wherein the processor, memory and/or transceiver are further configured to maintain another unique contact address at which the second client device can be contacted via the serving network and/or at which the operator of the second client device can be contacted.

28. The server of claim 27, wherein the processor, memory and/or transceiver are further configured to:
receive receiving, from a given device operated by the operator of the first client device, a supplemental request for supplemental data to be transmitted to the second client device and/or the operator of the second client device along with another indication of the temporary identifier; and
deliver the supplemental data to the second client device and/or the operator of the second client device using the another unique contact address while the first client device and the second client device remain disconnected from the local P2P connection.

29. The server of claim 28, wherein the given device is the first client device or another client device associated with the operator of the first client device.

30. The server of claim 28, wherein the temporary identifier is a temporary group identifier that is configured to be mapped to unique contact addresses of multiple different client devices and/or operators, and wherein the data and the supplemental data are delivered to one or more additional client devices and/or client device operators in addition to the second client device and/or the operator of the second client device.

31. The method of claim 1, wherein the temporary identifier is assigned to the second client device by a server.

32. The method of claim 10, wherein the registering, the assigning, the receiving, the associating and the generating are each performed by the server.

* * * * *